Patented Jan. 3, 1950

2,493,390

UNITED STATES PATENT OFFICE 2,493,390

STABILIZATION OF POLYMERS WITH AN INORGANIC PEROXIDE AND AN ESTER OF AN OXYACID OF PHOSPHORUS

Charles J. Chaban, Toledo, Ohio, assignor, by mesne assignments, to Stabelan Chemical Company, Toledo, Ohio, a partnership No Drawing. Application May 29, 1947,
Serial No. 751,467

20 Claims. (Cl. 260—45.7)

The invention relates to the treatment of polymeric organic compounds such as synthetic resins intended for use in various products including transparent, translucent, uncolored, dyed, pigmented or filled films, coatings, filaments and moldings, and particularly to the treatment of polymeric organic compounds with agents that improve their stability and durability.

One of the principal limitations on the usefulness of polymeric organic compounds is their limited resistance to light and heat and their limited stability or durability when subjected to flexing, abrasion or outdoor exposure. Polymerized vinyl compounds, for example, when subjected to outdoor exposure or to an accelerated weathering test or a carbon arc Fadeometer test, turn brown or black and become brittle in a relatively short time, particularly when they consist of transparent or translucent films or filaments which are not protected by the opacifying action provided by the presence of fillers or pigments.

The principal object of the invention is to produce a very marked improvement in the light resistance, heat resistance, weather resistance, abrasion resistance and resistance to flexing both at ordinary temperatures and at subnormal temperatures of polymeric organic compounds. More specific objects and advantages are apparent from the description, which merely discloses and illustrates the invention and is not intended to impose limitations upon the claims.

Treatment of a polymeric organic compound in accordance with the present invention is carried out after polymerization of the compound. Such treatment comprises subjecting the polymeric organic compound to intimate contact with an inorganic peroxide and not more than about one-tenth of its weight of an ester of an oxyacid of phosphorus, at a pH from about 8 to about 12.

Although the treatment of a polymeric organic compound in accordance with the invention produces a very marked improvement in the properties of the polymeric organic compound, it does not produce a violent effect like the action of a catalyst during the polymerization of an unsaturated compound. Peroxides have been used as catalysts in the polymerization of unsaturated compounds, but in order to present the polymerization from becoming too violent and to prevent inferior polymers from being produced they are used during the polymerization in a concentration that is only a small fraction of the peroxide concentration which in the present treatment gives an appreciable improvement in the properties of the organic polymer. Although the concentration of a polymerization catalyst is minute as compared with the concentration of the inorganic peroxide used in the present treatment, it heretofore has been considered desirable to remove even the relatively small trace of polymerization catalyst that remains after the polymerization.

The polymeric organic compounds whose properties are improved by the present treatment include chlorinated paraffins, chlorinated rubbers, chlorinated diphenyls and other polymeric halogen-containing organic compounds, and the product of the polymerization of a composition comprising one or more polymerizable organic compounds such as chloroprene, vinyl chloride, vinyl acetate, styrene, vinylidene chloride, methylmethacrylate, ethylmethacrylate, methylacrylate, acrylonitrile and other derivatives of acrylic acid, ethylene, isobutylene, isoprene, butadiene and other polymerizable unsaturated hydrocarbons. The present treatment is particularly useful in improving the properties of a thermoplastic organic polymer, such as a polymer of a vinyl compound, e. g. a vinyl hydrocarbon or a vinyl ester of an organic acid, and especially in improving the properties of the product of the polymerization of a composition comprising a substance containing a halogen atom and a polymerizable carbon-to-carbon double bond, such as an alpha-halo-substituted ethylene having from one to two alpha-halo substituents, e. g. vinyl chloride or vinylidene chloride. The term "product of the polymerization of a composition comprising a substance containing a polymerizable carbon-to-carbon double bond," as used herein, includes copolymers and synthetic rubbers, as well as modified polymers or reaction products of polymers, such as polyvinyl alcohol, polyvinyl butyral and polyvinyl formal.

The polymeric organic compound may be highly plasticized or unplasticized and may be in the form of a water emulsion, a dispersion in an inactive organic solvent, a dispersion in a plasticizer, or a solution in an active solvent.

The peroxides that may be used in the practice of the present invention include all inorganic peroxides, such as hydrogen peroxide, and the peroxides of light metals such as lithium, sodium, potassium, magnesium, calcium, strontium and barium and heavy metals such as chromium, manganese, iron, copper, zinc, cadmium, aluminum, tin, lead, antimony, titanium and silver. Often it is desirable that the peroxide be accompanied by a trace of a metallic silicate such as magnesium silicate in order to improve the stability of the peroxide. Peroxides of alkaline earth metals such as magnesium, calcium, strontium and barium are particularly useful.

A form of inorganic peroxide that is particularly useful in the practice of the invention is a complex of hydrogen peroxide with a metal salt; of course, such a complex is sufficiently stable so that it does not decompose before being incorporated with the other ingredients used. Such complexes include salts of perboric acid ($HBO_3$), permonophosphoric acid ($H_3PO_5$), perdiphosphoric acid ($H_4P_2O_8$) and percarbonic acid ($H_2C_2O_6$) with the metals listed in the preceding paragraph, and particularly sodium and the metals of the second group of the periodic classification, such as:

$NaBO_2.H_2O_2$
$NaBO_2.H_2O_2.3H_2O$
$Mg(BO_2)_2.2H_2O_2.1\frac{1}{2}H_2O$
$Mg(BO_2)_2.NaBO_2.3H_2O_2.4H_2O$
$Ba(BO_2)_2.1\frac{1}{2}H_2O_2.H_2O$
$Cd(BO_2)_2.1\frac{1}{2}H_2O_2.2H_2O$
$Na_2CO_3.1\frac{1}{2}H_2O_2$
$Na_2HPO_4.H_2O_2$
$Na_2P_2O_7.3H_2O_2$ In general, sodium perborate is preferred since it is the most readily and economically obtained commercially, but in some special applications barium and cadmium perborates may be preferred since they appear to impart better electrical properties and to allow a greater degree of transparency in a film of a composition embodying the invention.

The ingredients used in the practice of the invention in each case should be such that the composition is slightly or moderately alkaline, i. e., has a pH from about 8 to about 12. The polymeric organic compound need not be in an alkaline condition before the other ingredients are incorporated if the other ingredients are such as to render the composition alkaline. The inorganic peroxide, for example, may be such as to render the composition alkaline. If necessary, a separate alkaline agent may be incorporated with the polymeric organic compound either before, or simultaneously with, or after the incorporation of the other ingredients. The alkaline agent thus employed preferably is a weak basic substance when it is to be incorporated in a solid composition, because it is difficult to disperse a strong base in a solid composition finely enough so that the composition is free of loci of excessive alkalinity. Any weak organic or inorganic base may be used. The choice of the base may be determined by its physical properties. For example, tricalcium phosphate or sodium metaborate may be used as the base when a transparent product is desired. The proportion of the alkaline agent used depends upon its alkalinity and is simply an amount sufficient to render the composition appreciably alkaline. The preferred alkaline agents are metal carbonates, and salts of oxyacids of phosphorus or boron such as orthoboric acid ($H_3BO_3$), metaboric acid ($HBO_2$), pyroboric acid ($H_2B_4O_7$), orthophosphoric acid ($H_3PO_4$), pyrophosphoric acid ($H_4P_2O_7$), triphosphoric acid ($H_5P_3O_{10}$), tetraphosphoric acid ($H_6P_4O_{13}$) and metaphosphoric acid ($HPO_3$) with light metals and heavy metals such as the metals mentioned hereinbefore.

Esters of oxyacids of phosphorus, such as tricresyl phosphate, are highly compatible with all of the common thermoplastic polymers of vinyl compounds, and have been used as plasticizers for various polymeric organic compounds. The customary proportion of such an ester that is incorporated with a polymeric organic compound is about 40 to 50 per cent of the weight of the polymeric organic compound.

When there is incorporated with a polymeric organic compound and an inorganic peroxide, at a pH from about 8 to about 12, an amount of tricresyl phosphate equal to about 40 per cent or more of the weight of the polymeric organic compound, the composition, upon exposure to sunlight or artificial sunlight, deteriorates much more rapidly than it would if no tricresyl phosphate had been incorporated—often more than three times as rapidly. Thus the presence of an ester of an oxyacid of phosphorus would be expected to decrease the stability and durability of a composition embodying the invention. The present invention is based upon the discovery that, on the contrary, the presence, in a composition embodying the invention, of an ester of an oxyacid of phosphorus, in an amount not more than about one-tenth of the weight of the polymeric organic compound, increases the life of the composition upon exposure to sunlight or artificial sunlight by as much as 200 per cent or more.

An alkaline composition comprising a vinyl resin and $NaBO_2.H_2O_2.3H_2O$ deteriorates in a standard Fadeometer more than three times as fast as a composition that is the same except that it includes an amount of tricresyl phosphate equal to about five per cent of the weight of the resin. It has been discovered that the deterioration of the former composition consists in the formation of dark spots, whereas the more gradual deterioration of the latter composition consists in uniform darkening of the composition without the formation of dark spots.

Thus, the remarkable improvement produced by the presence in a composition embodying the invention of an amount of an ester of an oxyacid of phosphorus not more than about one-tenth the weight of the polymeric organic compound is due to a dispersing action of the ester upon the inorganic peroxide. The improvement produced by the dispersing action of the ester is an improvement in resistance to sunlight or artificial sunlight. Except for its dispersing action upon the inorganic peroxide, the ester has the effect of reducing the life of the composition, as evidenced by the fact that the heat resistance of the composition is inversely proportional to the amount of the ester in the composition. When the amount of the ester is not more than about one-tenth the weight of the polymeric organic compound, the improvement produced by the dispersing action of the ester upon the inorganic peroxide preponderates over the otherwise deleterious effect of the ester, and the proportion of the ester is not sufficient to impair materially the heat-resistance of the composition. When the ester is used in the greater proportions heretofore employed, however, the beneficial dispersing action of the ester upon the inorganic peroxide is completely outweighed by the otherwise deleterious action of the ester.

Any ester of an oxyacid of phosphorus may be used in the practice of the invention. Such esters (or mixtures thereof) in general are compatible in the sense that they form a stable suspension, dispersion or solution with polymeric organic compounds, and they are very highly compatible with all of the common thermoplastic polymers of vinyl compounds. The common esters which may be used include alkyl, aryl, alkaryl, and aralkyl esters or mixed esters or acid esters of orthophosphoric or pyrophosphoric acid, such as trimethyl, triethyl, tributyl, tributoxyethyl, triethylhexyl, amyl capryl acid, tri-dimethylphenyl, triphenyl, di-phenyl mono-o-xenyl, tri-p-tertiaryamylphenyl and tricresyl phosphates and mixtures thereof, as well as phosphated castor oils. Tricresyl phosphate is preferred since it is readily available commercially and usually gives the best all-around properties in the practice of the invention.

The amount of an ester (or esters) of an oxyacid of phosphorus which may be used in a composition of the invention is simply any amount which, in conjunction with the inorganic peroxide, imparts to the composition the beneficial properties hereinbefore described, and may range from a mere appreciable amount (e. g., about 0.1 per cent of the polymeric organic compound) to the maximum amount above which the deleterious effect of the ester per se counterbalances the beneficial effect of the ester as a dispersing agent, i. e., not more than about one-tenth (10-15 per cent) of the polymeric organic compound. (The terms "per cent" and "parts," as used herein to refer to quantities of material, mean per cent and parts by weight.) The preferred amount of ester is in the lower part of the range (e. g., not more than about one-twentieth of the polymeric organic compound), in which the deleterious effect of the ester is negligible and, at the same time, a substantial improvement in the light-resistance of the composition is obtained.

Since the amount of an ester of an oxyacid of phosphorus which may be used in the practice of the invention is limited, it may be desirable to incorporate other plasticizers which do not affect the heat and light stability in order to plasticize sufficiently the polymeric organic compound, i. e., to obtain the physical properties, such as flexibility, which are imparted by plasticizers. Although the ester of an oxyacid of phosphorus is itself a plasticizer, the term "plasticizer" as used hereinafter means a plasticizer (other than such ester) which is normally used in polymeric organic compounds. Such plasticizers include the standard commercial esters and other derivatives of phthalic, sebacic, glycolic, oleic, ricinoleic, toluenesulfonic, stearic and other synthetic fatty acids, the most commonly used of which are compounds such as diethylhexyl phthalate and dibutyl sebacate. The proportion and type of plasticizer used depends entirely upon the physical properties desired in the final product embodying the polymeric organic compound.

The amount of an inorganic peroxide or of a stable complex of hydrogen peroxide with a metal salt used in the practice of the invention may range from the minimum amount capable of imparting an appreciable improvement in stability (e. g., about 1 per cent of the polymeric organic compound) to the maximum amount above which there is no important increase in stabilizing effect (e. g., about one-tenth of the polymeric organic compound). Even larger amounts may be employed when a product of extremely high quality is required for heavy duty service, but usually are not necessary. In actual practice successive increases in the amount of peroxide ordinarily produce smaller and smaller improvements in the material. Different proportions of different peroxides must be added to the same composition in order to give the same results. Also, the proportion of a given peroxide to be added to the same composition in order to produce the same results varies with the degree to which the peroxide is dispersed in the composition, because the effectiveness of the peroxide increases with the degree of dispersion. The optimum amount of peroxide depends upon the particular peroxide (or mixture of peroxides) and the particular polymeric organic compound; for example, in the case of a copolymer of 95 parts vinyl chloride and 5 parts vinyl acetate, about 3 to 6 parts $NaBO_2.H_2O_2.3H_2O$ and about 5 parts tricresyl phosphate have been found to impart the best all-around properties.

If it is necessary to add an alkaline agent in order to make the composition slightly or moderately alkaline, the amount used is simply an amount sufficient to impart a pH from about 8 to about 12 to the resulting composition. The pH of the composition may be measured by agitating for five minutes a distilled water suspension of a finely divided sample of the composition and then testing in a Beckmann pH meter in the customary manner or, more rapidly, by the use of the Gramercy Universal Indicator, i. e., by violently shaking a finely divided sample (about one gram) of the composition and distilled water (10 ml.) in a test tube for five minutes, adding the Universal Indicator (0.5 ml.), and determining the pH of the water by comparison with the Gramercy color chart. The distilled water should be boiled before use to remove carbon dioxide.

The stabilizing agents (i. e., the ester of an oxyacid of phosphorus, the peroxide and in some cases an alkaline agent) used in the practice of the invention may be of any good commercial grade. They may be either soluble or insoluble in water. The agents usually appear to interact to some extent with the resin in that the water-soluble agents ordinarily are relatively inextractable after being dispersed in the resin.

The incorporation of the stabilizing agents in a composition of the invention may be carried out at ordinary temperatures by means of a ball mill when the composition is in solid form, or by means of any desired dispersing apparatus when the composition is in the form of a liquid solution or dispersion. Although the unique dispersing action of the ester is responsible to a great extent for the improved properties of a composition of the invention, it has been found that these properties may be improved even further by particular combinations of the agents and particular methods of incorporating them in the composition. For example, when a stable complex of hydrogen peroxide with a metal salt is used in the practice of the invention, it is sometimes desirable to use the hydrate or a salt containing water of crystallization (e. g., $NaBO_2.H_2O_2.3H_2O$ instead of $NaBO_2.H_2O_2$), since the hydrate is more easily dispersed on a rubber mill to obtain a highly transparent composition that forms a clear film. However, a better dispersion of an anhydrous salt (e. g., $NaBO_2.H_2O_2$) is obtained when it is ground with the polymeric organic compound in a ball mill, and a larger amount of the anhydrous substance may be so incorporated in the resin without causing a film of the resulting product to become milky upon exposure to ultra-violet light. Also, it has been found that the best results are obtained by the incorporation of the stabilizing agents at an elevated temperature. The temperature of incorporation may be any temperature that the composition will stand.

Most of the compositions are solids at ordinary temperatures and ordinarily it is most convenient to incorporate the agents at an elevated temperature at which the composition is soft enough to be worked but viscous enough to keep the agents in suspension. Any desired apparatus, such as a two-roll rubber mill, a Banbury mixer, a ball mill or a three-roll paint mill, may be used for incorporating the agents in the composition. The period of time required to incorporate the agents is simply that necessary to disperse the agents in the composition to the desired degree. If the incorporation is carried out at ordinary temperatures, the properties of the product sometimes may be improved by holding the product at an elevated temperature after the incorporation of the agents. The time required for such a heat treatment decreases as the temperature increases and depends upon whether it is desired to impart the best possible properties to the product or to impart intermediate properties by a shorter heat treatment.

The magnitude of the improvement in light resistance produced by treating a composition comprising a polymeric organic compound in accordance with the present invention may be demonstrated by a procedure carried out as follows:

A peroxide (2 parts of $NaBO_2 \cdot H_2O_2 \cdot 3H_2O$) and an ester of an oxyacid of phosphorus (2 parts of tricresyl phosphate) are incorporated in a composition consisting of a polymeric organic compound (a moderately high molecular weight copolymer of 95 parts of vinyl chloride and 5 parts of vinyl acetate), a plasticizer (50 parts of diethylhexyl phthalate) and a lubricant (1 part of stearic acid) by milling for ten minutes on a two-roll rubber mill at 300° F. and then calendering on a three-roll calender at 300° F. to produce a transparent sheet or film having a thickness of 0.010 inch. The resulting "test" film turns light brown and acquires a few dark spots in 622 hours of exposure in a standard Atlas FDA Fadeometer at 125° F., whereas a "control" film, prepared by the procedure that is the same except that the ester is omitted and the amount of plasticizer (diethylhexyl phthalate) used is 55 parts instead of 50 parts, turns light brown in 260 hours in the Fadeometer. In an accelerated weathering test (in a National Carbon Model X-1-A unit) the test film has a few yellow pin-point spots at the end of 300 hours exposure, whereas the control film turns light brown in 220 hours. In a natural weathering test (exposure in Miami, Florida) the test film has a few brown spots at the end of 400 ultra-violet hours exposure, whereas the control film develops numerous dark brown spots in 250 ultra-violet hours and turns completely dark brown in 350 ultra-violet hours of exposure.

The nature of the invention may be demonstrated more completely by a series of tests carried out as follows:

A peroxide (4.0 parts of $NaBO_2 \cdot H_2O_2 \cdot 3H_2O$), an alkaline agent (1.2 parts of tricalcium phosphate) and an ester of an oxyacid of phosphorus (tricresyl phosphate) are incorporated in a composition consisting of a polymeric organic compound (a copolymer of 190 parts of vinyl chloride and 10 parts of vinyl acetate), a plasticizer (diethylhexyl phthalate) and a lubricant (2 parts of stearic acid) by milling for ten minutes on a two-roll rubber mill at 300° F. and then calendering for five minutes on a three-roll calender at 300° F. to produce a film having a thickness of 0.010 inch. The film so produced is a clear, transparent film having the general appearance characteristics required of industrial film materials of this class.

Table 1 (below) shows the results of tests of the films prepared as above described, and more specifically describes the compositions from which the films are produced by specifying the parts of the ester (tricresyl phosphate) in the composition (column 2) and the parts of the plasticizer (diethylhexyl phthalate) in the composition (column 3). For the sake of comparison, test results for control films, i. e., films made from a composition which contains no ester (run 1A) and films made from a composition which contains no plasticizer (run 1M), are included in Table 1.

The tests employed are standard tests for synthetic film material and are considered to be capable of showing generally the heat and light resistance characteristics that are important in industrial film materials of this class. A separate description of the procedure and manner of obtaining the results in each test follows:

Heat aging tests at 325° F. (column 4) and at 350° F. (column 5)—Films of the composition after processing are subjected to a temperature of 325° F. and a temperature of 350° F. in separate convection ovens, (in each of which the temperature is controlled by an electrical thermostat) for periods of time such as 15 minutes, 30 minutes, 45 minutes and 60 minutes. The tests determine the resistance of the films to deterioration or aging by the action of heat at each of the two temperatures. The heat resistance at 325° F. (column 4) is denoted by the following numerical grades:

1. (Excellent) completely unchanged in transparency and flexibility in 60 minutes.
2. (Very good) very slight discoloration (yellowing) and stiffening of the film in 60 minutes.
3. (Good) slight discoloration (yellowing) of the film in 60 minutes.
4. (Fair) slight discoloration (yellowing) of the film in 45 minutes and noticeable stiffening of the film in 60 minutes.
5. (Poor) slight discoloration (yellowing) and stiffening of the film in 30 minutes.
6. (Very poor) slight discoloration (yellowing) and stiffening of the film in 15 minutes.

The heat resistance at 350° F. (column 5) is denoted by the following numerical grades:

1. (Excellent) moderate discoloration (yellowing) of the film in 60 minutes.
2. (Very good) moderate discoloration (yellowing) and slight stiffening of the film in 45 minutes.
3. (Good) pronounced discoloration (yellowing) and stiffening of the film in 45 minutes.
4. (Fair) moderate discoloration (yellowing) and stiffening of the film in 30 minutes.
5. (Poor) pronounced discoloration (yellowing) and stiffening of the film in 30 minutes.
6. (Very poor) discoloration (yellowing) and stiffening of the film in 15 minutes.

Fadeometer test (columns 6 and 7)—The films of the composition after processing are exposed to ultra-violet light from a carbon arc in an Atlas FDA Fadeometer at 125° F. The test determines the resistance of the films to deterioration by the action of ultra-violet light, and the results given are the hours of exposure required to cause the film to deteriorate substantially either by becoming badly spotted and stiff (column 6) or by becoming comparatively evenly discolored (yellow or light brown) and stiff (column 7).

Table 1

| Run | Ester, Parts | Plasticizer, Parts | Heat Aging Test 325° F. (Grade) | Heat Aging Test 350° F. (Grade) | Fadeometer Test Badly Spotted, Hours | Fadeometer Test Evenly Discolored, Hours |
|---|---|---|---|---|---|---|
| 1A | 0 | 100 | 1 | 3 | 181 | |
| 1B | 2 | 98 | 1 | 3 | 475 | |
| 1C | 5 | 95 | 1 | 3 | 556 | |
| 1D | 10 | 90 | 1 | 3 | | 700 |
| 1E | 20 | 80 | 2 | 3 | | 466 |
| 1F | 30 | 70 | 2 | 3-4 | | 256 |
| 1G | 40 | 60 | 2 | 3-4 | | 208 |
| 1H | 50 | 50 | 3 | 3-4 | | 164 |
| 1I | 60 | 40 | 3-4 | 3-4 | | 98 |
| 1J | 70 | 30 | 4-5 | 4 | | 119 |
| 1K | 80 | 20 | 5 | 5 | | 64 |
| 1L | 90 | 10 | 5 | 5 | | |
| 1M | 100 | 0 | 6 | 6 | | 25 |

From Table 1 it can be seen that the heat resistance of the films decreases steadily as the amount of the ester in the composition is increased, but that the heat resistance is not appreciably affected until the amount of the ester used is greater than about 20 parts (i. e., 10 per cent of the polymeric organic compound in the composition—see run 1E) and the heat resistance remains at least "good" (grade 3) until the amount of the ester used is greater than about 40 parts (i. e., 20 per cent of the polymeric organic compound in the composition—see run 1G). On the other hand, the unique light resistance imparted in the practice of the present invention is strikingly pointed out by the results of the Fadeometer test. For example, hours of exposure which the film is capable of withstanding without appreciable deterioration in the Fadeometer test increase very rapidly as small amounts of the ester are added to the composition (e. g. the hours of exposure are increased over 150 per cent when the amount of the ester used is 1 per cent of the polymeric organic compound—see run 1B) and the resistance to deterioration continues to increase rapidly with further additions of the ester. A maximum is reached when the amount of the ester used is about 10 parts (i. e., 700 hours of exposure when the amount of the ester used in the composition is approximately 5 per cent of the polymeric organic compound—see run 1D). As the amount of the ester used is increased beyond 10 parts the resistance to deterioration in the Fadeometer decreases comparatively rapidly. When the amount of the ester used is about 40 parts (run 1G) the resistance of the film is equal to that of the control film (run 1A). The resistance continues to decrease as the amount of the ester used is increased so that when the amount of the ester used in the composition is 100 parts (i. e., 50 per cent of the polymeric organic compound—see run 1M), the resistance to light is equal to about 14 per cent of that of the orginal control film (run 1A) and about 3 per cent of that of the film possessing the greatest resistance to deterioration (run 1D). Also, as the amount of the ester in the composition is increased, the improvement in the dispersion of the stabilizing agents can be clearly seen in that the character of deterioration changes from the development of numerous brown spots (column 6) to a gradual even change of color throughout the film (column 7).

If the same tests are carried out employing another polymeric organic compound and particularly a product of the polymerization of a composition comprising a substance containing a halogen atom and a polymerizable carbon-to-carbon double bond hereinbefore described, the same unique light resistance is imparted to the films produced from compositions containing substantially the same proportions of the ester. In each case the optimum amount of a specific ester to be used is obtained (subject in some degree to other variables, such as the manner of processing the film and the amount of peroxide used) by determination of the composition which has the maximum light resistance and yet a substantially unimpaired heat resistance. In some cases the effect of the presence of the ester upon the light resistance is not quite so pronounced, but the optimum composition, even though not so sharply defined as in the foregoing test, is found to contain an amount of ester within the low range hereinbefore described (i. e., not more than about one-tenth of the polymeric organic compound).

The improvement produced by treating the product of the polymerization of a composition comprising a substance containing a halogen atom and a polymerizable carbon-to-carbon double bond in accordance with the present invention may be demonstrated by tests carried out as follows:

A peroxide ($NaBO_2.H_2O_2.3H_2O$), an alkaline agent (tricalcium phosphate) and an ester of an oxyacid of phosphorus (tricresyl phosphate) are incorporated in a composition consisting of a polymeric organic compound (100 parts of a high molecular weight polyvinyl chloride), a plasticizer (diethylhexyl phthalate) and a lubricant (1 part of stearic acid) by milling for ten minutes on a two-roll rubber mill at 310° F. and then calendering for five minutes on a three-roll calender at 300–310° F. to produce a film having a thickness of 0.010 inch.

Table 2 (below) shows the results of tests of the films prepared as above-described, and more specifically describes the compositions from which the films are produced by specifying the parts of the ester in the composition (line 2), the parts of the plasticizer in the composition (line 3), the parts of the peroxide in the composition (line 4) and the parts of the alkaline agent in the composition (line 5). For the sake of comparison, tests results for control films, i. e., films made from a composition which contains no ester and no tricalcium phosphate (run 2A) and films made from a composition which contains no ester (run 2C), are included in Table 2.

The tests employed are standard tests for synthetic film material and are considered to be capable of showing generally the characteristics that are important in industrial film materials of this class. A separate description of the procedure and manner of obtaining the results in each test follows:

Transparency (line 6), discoloration (line 7) and dispersion (line 8)—A film of the composition after it has been processed (i. e., milled and calendered) is visually examined against a background of white and against a background of black. The transparency, which is determined essentially by observation of the film against a black background, is denoted by the following numerical grades:

1. (Excellent) completely transparent film.
2. (Very good) very slight cloud apparent in the film upon close observation.
3. (Good) slight cloud in the film.
4. (Fair) cloudy film.
5. (Poor) milky film having cloudiness appreciably affecting the transparency.

The discoloration (usually yellowing), which is determined essentially by observation of the film against a white background, is denoted by the following numerical grades:

1. (None) no discoloration of the film.
2. (Very slight) very slight discoloration of the film apparent upon close observation.
3. (Slight) noticeable discoloration of the film.

The dispersion, which is determined essentially by observation of the film against a black background, is denoted by the following numerical grades:

1. (Excellent) completely uniform transparency of the film, with no streaks of discoloration or cloudiness or bubbles.
2. (Very good) very few streaks or bubbles in the film, visible only upon close observation.
3. (Good) a few streaks or bubbles in the film, not sufficient to affect the transparency appreciably.
4. (Fair) noticeable streaks or bubbles in the film.

Heat aging tests at 325° F. (line 9) and at 350° F. (line 10)—The films are subjected to the heat aging tests hereinbefore described.

Fadeometer test (line 11)—The films are subjected to the standard Fadeometer test hereinbefore described, and the results obtained are the hours of exposure required to cause substantial deterioration either in the form of brown spots in the film or in the form of uniform discoloration.

Accelerated weathering test (line 12)—The films are tested in a National Carbon Model X-1-A unit, and the results obtained are the hours of exposure required to cause substantial deterioration either in the form of brown spots or in the form of uniform discoloration of the film.

Natural weathering test (line 13)—The films are exposed to natural weather conditions in Miami, Florida, and the results obtained are the number of ultra-violet hours (calculated on the basis of the "standard ultra-violet hour") of exposure required to cause substantial deterioration of the film as described for the Fadeometer and accelerated weathering tests.

Table 2

| | 2A | 2B | 2C | 2D | 2E |
|---|---|---|---|---|---|
| 1. Run | 2A | 2B | 2C | 2D | 2E |
| 2. Ester, parts | | 5 | | 5 | 5 |
| 3. Plasticizer, parts | 55 | 50 | 55 | 50 | 50 |
| 4. Peroxide, parts | 3 | 3 | 2 | 2 | 2.6 |
| 5. Alkaline Agent, parts | | | 0.6 | 0.6 | [1] 0.8 |
| 6. Transparency (grade) | 4-5 | 4 | 3 | 2 | 2 |
| 7. Discoloration (grade) | 2 | 1-2 | 1 | 1 | 1 |
| 8. Dispersion (grade) | 4 | 3 | 3 | 1 | 2 |
| 9. Heat Aging; 325° F. (grade) | 2 | 2 | 1 | 1 | 1 |
| 10. Heat Aging; 350° F. (grade) | 4 | 4 | 3 | 2 | 3 |
| 11. Fadeometer test, hours | 300 | 1,000 | 500 | 1,200 | 900 |
| 12. Accelerated Weathering, hours | 300 | [2] 705 | 400 | 700 | [3] 700 |
| 13. Natural Weathering (Ultra-violet hours) | 550 | 700 | [3] 700 | [3] 900 | [3] 550 |

[1] 0.4 part (Ca)₃(PO₄)₂ and 0.4 part Na₃PO₄.
[2] Still not discolored.
[3] Still in excellent condition.

From Table 2 it can be seen that films from compositions containing both the ester and the peroxide (runs 2B, 2D and 2E) have substantially better resistance to deterioration by the action of light than films from the control compositions (runs 2A and 2C) which do not contain the ester.

The transparency, discoloration and dispersion tests are used to aid in determining the compatibility of the ingredients in the composition (i. e., as evidenced by the grades of transparency and dispersion) and the maximum temperature at which the composition may be processed (i. e., without discoloration). The film properties disclosed in such tests may be altered to some extent by variations in the method of processing, such as variations in the milling time or temperature, but for the purposes of the present invention, the tests serve to demonstrate that the compositions used are capable of being processed by ordinary industrial procedures to produce films which meet the standard requirements of industrial film materials.

The improvement produced by treating the product of the polymerization of a composition comprising an alpha-halo-substituted ethylene having from one to two alpha-halo substituents in accordance with the present invention may be demonstrated by tests carried out as follows:

A peroxide ($NaBO_2 \cdot H_2O_2 \cdot 3H_2O$), an alkaline agent (tricalcium phosphate) and an ester of an oxyacid of phosphorus (tricresyl phosphate) are incorporated in a composition consisting of a copolymer of alpha-halo-substituted ethylene (a copolymer of 90 parts of vinyl chloride and 10 parts of vinylidene chloride), a plasticizer (dietylhexyl phthalate) and a lubricant (1 part stearic acid) by milling for ten minutes on a two-roll rubber mill at 270° F. and then calendering for five minutes on a three-roll calender at 270° F. to produce a film having a thickness of 0.010 inch.

Table 3 (below) shows the results of the tests of the films prepared as above described, and more specifically describes the compositions from which the films are produced by specifying the parts of the ester in the composition (line 2), the parts of the plasticizer in the composition (line 3), the parts of the peroxide in the composition (line 4) and the parts of the alkaline agent in the composition (line 5). The test results, obtained in the manner hereinbefore described, include the grade of transparency of the film (line 6), the grade of the discoloration in the film (line 7), the grade of the dispersion in the film (line 8), the grade of the heat resistance of the film in the heat aging tests at 325° F. (line 9) and at 350° F. (line 10), the number of hours required to cause substantial deterioration of the film in the Fadeometer test (line 11), the number of hours required to cause substantial deterioration of the film in the accelerated weathering test (line 12) and the number of ultra-violet hours required to cause substantial deterioration of the film in the natural weathering test at Miami, Florida (line 13). For the sake of comparison, test results for control films, i. e., films made from a composition which contains no ester and no tricalcium phosphate (run 3A) and films made from a composition which contains no ester (run 3B), are included in Table 3.

Table 3

| | 3A | 3B | 3C | 3D |
|---|---|---|---|---|
| 1. Run | 3A | 3B | 3C | 3D |
| 2. Ester, Parts | | | 5 | 5 |
| 3. Plasticizer, Parts | 48 | 45 | 40 | 40 |
| 4. Peroxide, Parts | 3 | 2.7 | 2.7 | 2.7 |
| 5. Alkaline Agent, Parts | | 0.8 | 0.8 | [1] 0.8 |
| 6. Transparency (Grade) | 2 | 1 | 1 | 1 |
| 7. Discoloration (Grade) | 2 | 1 | 2 | 1 |
| 8. Dispersion (Grade) | 2 | 1 | 1 | 1 |
| 9. Heat Aging; 325° F. (Grade) | | 3 | 3 | 1 |
| 10. Heat Aging; 350° F. (Grade) | 2 | 4 | 3 | |
| 11. Fadeometer test, Hours | 320 | 725 | 1,000 | [3] 760 |
| 12. Accelerated Weathering, Hours | 275 | 500 | [3] 620 | [3] 610 |
| 13. Natural Weathering (Ultra-violet hours) | 450 | [2] 500 | [3] 550 | [3] 550 |

[1] 0.4 part (Ca)₃(PO₄)₂ and 0.4 part Na₃PO₄.
[2] Very slight discoloration.
[3] Still in excellent condition.

From Table 3 it can be seen that the light resistance of the films is appreciably improved over that of the control film (run 3A) by the incorporation of an alkaline agent in the composition (run 3B), but that the light resistance is substantially improved (e. g., about 200 per cent in the Fadeometer test) by the incorporation of the ester in the composition (runs 3C and 3D).

The action of the combination of agents used in the practice of the present invention is believed to be due in part to the ability of such combination of agents to react with nascent oxygen. The agents are believed to react with nascent oxygen by themselves giving up oxygen which combines with the nascent oxygen to produce molecular oxygen. Such elimination of nascent oxygen from a composition comprising a polymeric organic compound is believed to improve the properties of the composition because nascent oxygen, which may be produced by heat and light from molecular oxygen that has entered the composition from the atmosphere, has a tendency to rupture a chain in the compound in which a double bond occurs, with the formation of aldehyde or even carboxylic acid groups at the broken ends of the chain. The presence of such broken chains in the compound impairs the properties of the composition and causes it to deteriorate more readily under the influence of heat and light. Thus, by such action of the agents used in the practice of the invention, nascent oxygen, as it is formed from molecular oxygen by the action of heat and light, is reconverted into molecular oxygen, which per se is believed to be harmless, and the composition is protected for a considerable period of time against the degrading effect of nascent oxygen. The inorganic peroxides or stable complexes of hydrogen peroxide with a metal salt, and particularly complexes with metal salts of oxyacids of boron, may also combine with the chain molecules containing double bonds to produce branch- or cross-polymerization which inhibits the rupturing action of nascent oxygen.

The agents used in the present invention may also cause further polymerization to take place after they are incorporated with the molecules of various chain lengths which are included in a polymeric organic compound. Such further polymerization may cause the chain molecules to approach a uniform, equilibrium length which gives the composition improved properties. Such equalization of the lengths of the chains may take place by polymerization or combining of the short chains and depolymerization or shortening of the long chains.

Many of the peroxides used in the practice of the present invention are alkaline and are believed to have an additional beneficial effect because of their alkalinity. The alkalinity also may be caused by an alkaline agent, and the additional beneficial effect is to neutralize acidity such as the acidity produced by the formation of carboxylic acid groups at the broken ends of the chains when rupturing by the action of nascent oxygen has taken place. Formation of acidity may occur also in the case of an alpha-halo-substituted ethylene or a copolymer thereof and in the case of resinous halogenated hydrocarbons and other halogen-bearing compounds when a hydrogen atom and a halogen atom are split off from two adjacent carbon atoms to form a hydrogen halide molecule, leaving a double bond between the two adjacent carbon atoms. The formation of such double bonds causes darkening of a resin and may lead to rupturing of the resin molecules as explained hereinbefore. The neutralization of such acidity is believed to be beneficial because acidification of a resinous composition is believed to cause auto-acceleration of the degradation reactions by which the acidity is produced. The beneficial action of the agents used in the practice of the invention cannot be explained on the ground of alkalinity alone, however, because the improvement produced by the incorporation of the present agents is far greater than the improvement that can be produced by the mere incorporation of an alkaline agent.

It is believed that the use of an ester of an oxyacid of phosphorus in the combination of agents used in the practice of the invention is instrumental in achieving an extremely high degree of dispersion of the agents in the composition. It has been found that the higher the degree of dispersion, the better and more uniform is the stabilizing action of the agents in the composition during the processing (i. e., milling and calendering), as well as during subsequent aging and exposure of the composition. The degree of dispersion may be improved also by the use of a peroxide which is a stable complex of hydrogen peroxide with a suitable metallic salt or by the use of high temperatures during the processing. However, the beneficial action of the agents used in the practice of the invention is greater than could be expected merely from a very high degree of dispersion and it is believed that addition products, perhaps between the ester and the peroxide, are formed whereby the action on nascent oxygen hereinbefore described is strengthened substantially.

It is often desirable to incorporate in the composition other ingredients such as fillers, pigments or opacifiers. In fact, such ingredients may have the effect of "screening" or decreasing the amount of light which may enter the body of the composition, and thereby increasing the resistance of the composition to light. The intended use of the composition comprising the polymeric organic compound determines to a certain extent the agents or ingredients to be incorporated in the composition; but, of course, the ingredients must be compatible in the sense that they are capable of forming a stable suspension, dispersion or solution. The esters, which are per se highly compatible in that they are miscible with most polymeric organic compounds, are understood to contribute substantially to the compatibility of the other ingredients as a part of the unique dispersing action of the esters. Logically, if any substantial quantity of fillers, pigments or opacifiers is used in the composition, the highest degree of compatibility or uniformity may not be required. Since the tests hereinbefore described, which are used for the purpose of determining the properties of films of the compositions, are essentially visual examinations of the films, these tests are less effective for specifically determining such properties as compatibility (i. e., transparency and dispersion), discoloration, heat aging and light resistance (i. e., by Fadeometer, accelerated weathering and natural weathering tests) when the composition comprising the polymeric organic compound also contains fillers, pigments or opacifiers; and therefore the preferred procedure for determining specifically such properties of the compositions consists in the preparation and testing of transparent films.

Example 1

Films are prepared from a composition comprising a polymeric organic compound by incorporating an ester of an oxyacid of phosphorus and a peroxide, for example, a stable complex of hydrogen peroxide with a metaborate of a metal, according to the following procedure:

A peroxide (2 parts of $Ba(BO_2)_2.1\frac{1}{2}H_2O_2.H_2O$) is incorporated in a composition consisting of a polymeric organic compound (100 parts of a high molecular weight polyvinyl chloride), a plasticizer (55 parts of diethylhexyl phthalate) and a lubricant (1 part of stearic acid) by milling for ten minutes on a two-roll rubber mill at 310° F. and then calendering for five minutes on a three-roll calender at 300–310° F. to produce a film having a thickness of 0.010 inch.

Another procedure is carried out that is the same as that described in the foregoing paragraph except that an ester of an oxyacid of phosphorus (5 parts of tricresyl phosphate) is incorporated in the composition and the amount of plasticizer (diethylhexyl phthalate) used is 50 parts instead of 55 parts. Still another procedure is carried out that is the same as that described in the foregoing paragraph except that an alkaline agent (0.6 part of tricalcium phosphate) is incorporated in the composition.

The films so produced are clear, transparent films having the general appearance characteristics required of industrial films of this class, and the films prepared from the composition which contains the ester are extremely clear films with excellent dispersion. The films are tested to determine their light resistance according to the procedure hereinbefore described.

Table 4 (below) shows the results of the tests of the films so prepared, and more specifically describes the compositions from which the films are produced by specifying the parts of the ester in the composition (line 2), the parts of the plasticizer in the composition (line 3) and the parts of the alkaline agent in the composition (line 4). The test results obtained include the grade of heat resistance of the films in the heat aging tests at 325° F. (line 5) and at 350° F. (line 6), the number of hours required to cause substantial deterioration of the films in the Fadeometer test (line 7), the number of hours required to cause substantial deterioration of the films in the accelerated weathering test (line 8) and the number of ultra-violet hours required to cause substantial deterioration of the films in the natural weathering test at Miami, Florida (line 9).

Table 4

| | 4A | 4B | 4C |
|---|---|---|---|
| 1. Run | 4A | 4B | 4C |
| 2. Ester, Parts | --- | 5 | --- |
| 3. Plasticizer, Parts | 55 | 50 | 55 |
| 4. Alkaline Agent, Parts | --- | --- | 0.6 |
| 5. Heat Aging; 325° F. (Grade) | 2 | 2 | 1 |
| 6. Heat Aging; 350° F. (Grade) | 3 | 3 | 3 |
| 7. Fadeometer, Hours | 185 | ¹225 | 300 |
| 8. Accelerated Weathering, Hours | 185 | 500 | 260 |
| 9. Miami, Florida (Ultra-violet hours) | 250 | ¹400 | --- |

¹ Still in excellent condition.

From Table 4 it can be seen, particularly in the accelerated weathering test (line 8), that the light resistance of the films produced from the composition containing the ester and the peroxide (run 4B) is substantially improved over that of the control films (run 4A).

Substantially the same results are obtained by use of any of the other metal perborates or mixtures thereof hereinbefore described, such as sodium, magnesium and cadmium perborates.

Example 2

Films are prepared from a composition comprising a polymeric organic compound by incorporating an ester of an oxyacid of phosphorus and a peroxide, for example, a stable complex of hydrogen peroxide with a metal carbonate, according to the following procedure:

A peroxide (2.65 parts of $Na_2CO_3.1\frac{1}{2}H_2O_2$) and an ester (5 parts of tricresyl phosphate) are incorporated in a composition consisting of a polymeric organic compound (a medium high molecular weight copolymer of 95 parts of vinyl chloride and 5 parts of vinyl acetate), a plasticizer (45 parts of diethylhexyl phthalate) and a lubricant (1 part of stearic acid), by milling for ten minutes on a two-roll rubber mill at 290–300° F. and calendering for five minutes on a three-roll calender at 290–300° F. to produce a film having a thickness of 0.010 inch.

The film so produced has excellent transparency and dispersion (i. e., grade 1) and no discoloration (i. e., grade 1). In the heat aging tests the results obtained from the film are very good (i. e., grade 2) and in the Fadeometer test substantial deterioration does not take place in 720 hours. Substantially the same results are obtained if other salts of percarbonic acid or mixtures thereof are used.

Example 3

Films are prepared from a composition comprising a polymeric organic compound by incorporating an ester of an oxyacid of phosphorus and a peroxide, for example, a stable complex of hydrogen peroxide with a metal pyrophosphate, according to the following procedure:

A peroxide (2 parts of $Na_4P_2O_7.3H_2O_2$) and an ester (5 parts of tricresyl phosphate) are incorporated in a composition consisting of a polymeric organic compound (a medium high molecular weight copolymer of 95 parts of vinyl chloride and 5 parts of vinyl acetate), a plasticizer (45 parts of diethylhexyl phthalate) and a lubricant (1 part of stearic acid) by milling for ten minutes on a two-roll rubber mill at 290–300° F. and calendering for five minutes on a three-roll calender at 290–300° F. to produce a film having a thickness of 0.010 inch.

The film so produced has good transparency and dispersion (i. e., grade 3) and very slight discoloration (i. e., grade 2). In the heat aging tests, the results obtained are good (i. e., grade 3) and in the Fadeometer test 450 hours of exposure are required to cause substantial deterioration. Substantially the same results are obtained if salts of perdiphosphoric acid are used.

Example 4

Films are prepared from a composition comprising a polymeric organic compound by incorporating an ester of an oxyacid of phosphorus and a peroxide, for example, a metal peroxide, according to the following procedure:

A peroxide (3 parts of $BaO_2$) is incorporated in a composition consisting of a polymeric organic compound (a medium high molecular weight copolymer of 90 parts of vinyl chloride and 10 parts of vinyl acetate), a plasticizer (45 parts of diethylhexyl phthalate) and a lubricant (2 parts of diethylene glycol monostearate) by milling for ten minutes on a two-roll rubber mill at 240–250° F. and calendering for five minutes on a three-roll calender at 220–245° F. to produce a film having a thickness of 0.010 inch.

The film so produced has fair transparency and dispersion (i. e., grade 4) and if a procedure is carried out that is the same as that described in the foregoing paragraph except that an ester of an oxyacid of phosphorus (5 parts of tricresyl phosphate) is incorporated in the composition and the amount of plasticizer (diethylhexyl phthalate) used in 40 parts instead of 45 parts, the resulting film is an extremely clear, transparent film having the general appearance characteristics required in industrial films of this class. When the films are tested the improvement in light resistance produced by the addition of the ester is substantially the same as that described in the foregoing examples. Substantially the same results are obtained if other inorganic peroxides are used such as the peroxides of light metals and heavy metals hereinbefore described.

*Example 5*

Films are prepared from a composition comprising a polymeric organic compound by incorporating an ester of an oxyacid of phosphorus and a peroxide, for example, hydrogen peroxide, by carrying out a procedure that is the same as that described in the last paragraph of Example 4 except that the peroxide used is a 30 per cent aqueous hydrogen peroxide solution (4 parts) instead of barium peroxide. The results obtained are substantially the same as those described in Example 4.

*Example 6*

Films are prepared by incorporating an ester of an oxyacid of phosphorus and a peroxide in a composition comprising a polymeric organic compound, for example, a mixture of a vinyl copolymer and a butadiene-acrylontrile copolymer, according to the following procedure:

A peroxide (2.65 parts of $NaBO_2.H_2O_2.3H_2O$), an alkaline agent (0.8 parts of tricalcium phosphate) and an ester (5 parts of tricresyl phosphate) are incorporated in a composition consisting of 75 parts of a vinyl copolymer (a medium high molecular weight copolymer of 71 parts of vinyl chloride and 4 parts of vinyl acetate) and 25 parts of a synthetic rubber (a copolymer of 4.5 parts of acrylonitrile and 20.5 parts of butadiene), a plasticizer (40 parts of diethylhexyl phthalate) and a lubricant (1 part of stearic acid) by milling for ten minutes on a two-roll rubber mill at 280–290° F. and then calendering for five minutes on a three-roll calender at 280–290° F. to produce a film having a thickness of 0.010 inch.

The resulting film has very good transparency and dispersion (i. e., grade 2) and very slight discoloration (i. e., grade 2). The results obtained in the heat aging tests are good (i. e., grade 3) and in the Fadeometer test substantial deterioration requires 550 hours. If neither the ester nor the peroxide is incorporated in the composition the resistance to light is substantially decreased; for example, if a standard commercial stabilizer (lead silicate) is used instead of the peroxide and the ester, the film produced deteriorates substantially in the Fadeometer test in less than 70 hours.

*Example 7*

Films are prepared by incorporating an ester of an oxyacid of phosphorus and a peroxide in a composition comprising a polymeric organic compound, for example, a polymeric ethylene compound, according to the following procedure:

A peroxide (2 parts of $NaBO_2.H_2O_2.3H_2O$) is incorporated in a composition consisting of 100 parts of polyethylene, 40 parts of polyisobutylene having a molecular weight of about 60,000 and a lubricant (3 parts of diethylene glycol monostearate) by milling for fifteen minutes on a two-roll rubber mill at 260–280° F. and then calendering for five minutes on a three-roll calender at 240° F. to produce a film having a thickness of 0.010 inch.

If a procedure is carried out that is the same as that described in the foregoing paragraph except that an ester of an oxyacid of phosphorus (5 parts of tricresyl phosphate) is incorporated in the composition, the resulting film is an extremely clear, transparent film having the general appearance characteristics required of industrial films of this class, and when the films are tested the improvement in light resistance produced by the addition of the ester is substantially the same as that described in Example 6.

*Example 8*

Films are prepared by incorporating an ester of an oxyacid of phosphorus and a peroxide in a composition comprising a polymeric organic compound, for example, a butadiene-styrene synthetic rubber, according to the following procedure:

A peroxide (2 parts of $NaBO_2.H_2O_2.3H_2O$), an alkaline agent (0.6 parts of tricalcium phosphate) and an ester (5 parts of tricresyl phosphate) are incorporated in a composition consisting of a synthetic rubber (100 parts of a copolymer of 23.5 parts of styrene and 76.5 parts of butadiene), a lubricant (1 part of stearic acid), zinc oxide (5 parts), mercapto benzothiazol (1.5 parts), tetraethyl thiuramdisulfide (0.25 parts), sulfur (2 parts) and clay (100 parts) by milling the synthetic rubber alone for five minutes and then milling with the other ingredients for ten minutes on a two-roll rubber mill at 180–200° F., and calendering for five minutes on a three-roll calender at 200–220° F., to produce a film having a thickness of 0.010 inch.

The resulting film is vulcanized for two hours at 260° F. to produce an opaque, gray film of excellent quality and appearance. In the Fadeometer tests the film so produced shows excellent resistance to light in that it discolors (turns brown) approximately one-half as rapidly as a film produced by the procedure that is the same as that given in the example except that the ester and the peroxide are omitted.

*Example 9*

Films are prepared by incorporating an ester of an oxyacid of phosphorus and a peroxide in a composition comprising a polymeric organic compound, for example, a butadiene-acrylonitrile synthetic rubber, according to the following procedure:

A peroxide (2 parts of $NaBO_2.H_2O_2.3H_2O$), an alkaline agent (0.6 parts of tricalcium phosphate) and an ester (5 parts of tricresyl phosphate) are incorporated in a composition consisting of a synthetic rubber (100 parts of a copolymer of 26 parts of acrylonitrile and 74 parts of butadiene), a plasticizer (35 parts of diethylhexyl phthalate), a lubricant (1 part of stearic acid), sulfur (2.5 parts) and benzothiazyldisulfide (1.5 parts) by milling the synthetic rubber alone for five minutes and then milling with the other ingredients for ten minutes on a two-roll rubber mill at 180–200° F., and calendering for five minutes on a three-roll calender at 200–220° F. to produce a film having a thickness of 0.010 inch.

The resulting film is vulcanized according to the procedure described in Example 8, and the results obtained by testing the film so produced are substantially the same as those given in Example 8.

Example 10

Films are prepared from a composition comprising a polymeric organic compound by incorporating a peroxide and an ester of an oxyacid of phosphorus, for example, triphenyl phosphate, according to the following procedure:

A peroxide (2.2 parts of $NaBO_2.H_2O_2.3H_2O$), an alkaline agent (0.45 parts of tricalcium phosphate) and an ester (0.45 parts of triphenyl phosphate) are incorporated in a composition consisting of a polymeric organic compound (100 parts of a high molecular weight polyvinyl chloride), a plasticizer (55 parts of diethylhexyl phthalate), and a lubricant (1 part of stearic acid) by milling for ten minutes on a two-roll rubber mill at 310–320° F. and calendering for five minutes on a three-roll calender at 300–310° F. to produce a film having a thickness of 0.010 inch.

The film so produced is an extremely clear, transparent film having excellent heat resistance (i. e., grade 1) and having superior light resistance in that 400 ultra-violet hours of exposure in a natural weathering test are required to cause substantial deterioration of the film.

Example 11

Films are prepared from a composition comprising a polymeric organic compound by incorporating a peroxide and an ester of an oxyacid of phosphorus, for example, diphenyl cresyl phosphate, according to the following procedure:

A peroxide (2.65 parts of $NaBO_2.H_2O_2.3H_2O$), an alkaline agent (0.8 parts of tricalcium phosphate) and an ester (5 parts of diphenyl cresyl phosphate) are incorporated in a composition consisting of a polymeric organic compound (a medium high molecular weight copolymer of 5 parts of vinyl acetate and 95 parts of vinyl chloride), a plasticizer (45 parts of diethylhexyl phthalate) and a lubricant (1 part of stearic acid) by milling for ten minutes on a two-roll rubber mill at 290–300° F. and calendering for five minutes on a three-roll calender at 280–290° F. to produce a film having a thickness of 0.010 inch. The film so produced has very good transparency and dispersion (grade 2) and a very slight dicoloration (grade 3).

The heat aging properties of the film so produced are very good (i. e. grade 2) and the light resistance of the film is excellent in that 450 hours of exposure in the Fadeometer test are required for substantial deterioration of the film.

Example 12

Films are prepared from a composition comprising a polymeric organic compound by incorporating a peroxide and an ester of an oxyacid of phosphorus, for example, triethylhexyl phosphate, by carrying out a procedure that is the same as that described in Example 11 except that the ester used is triethylhexyl phosphate instead of diphenyl cresyl phosphate. The films so produced have excellent transparency and dispersion (i. e. grade 1) and no discoloration (i. e., grade 1). The heat aging properties of the films are very good (i. e., grade 2) and the light resistance of the films is excellent in that 480 hours of exposure in the Fadeometer test are required to cause the films to deteriorate substantially.

Example 13

Films are prepared from a composition comprising a polymeric organic compound by incorporating a peroxide and an ester of an oxyacid of phosphorus, for example, tributyl phosphate, according to the following procedure:

A peroxide (2 parts of $NaBO_2.H_2O_2.3H_2O$), an alkaline agent (0.6 parts of tricalcium phosphate) and an ester (1.5 parts of tributyl phosphate) are incorporated in a composition consisting of a polymeric organic compound (100 parts of a high molecular weight polyvinyl chloride), a plasticizer (55 parts of diethylhexyl phthalate) and a lubricant (0.75 parts of stearic acid) by milling for ten minutes on a two-roll rubber mill at 310–320° F. and calendering for five minutes on a three-roll calender at 300–310° F. to produce a film having a thickness of 0.010 inch.

The film so produced has excellent transparency and dispersion (i. e., grade 1) and no discoloration (i. e., grade 1). The heat aging properties of the film are excellent (i. e. grade 2) and the light resistance of the film is extremely good in that 392 hours of exposure in the Fadeometer test or 350 ultra-violet hours in the natural weathering test are required to cause the film to deteriorate substantially.

Example 14

Films are prepared by a procedure which is the same as that given in Example 13 except that the ester used is triethyl phosphate (1.9 parts) instead of tributyl phosphate. The films so produced have excellent transparency and dispersion (i. e., grade 1) and no discoloration (i. e., grade 1). The heat aging properties of the films are excellent (i. e., grade 1) and the light resistance is extremely high in that 468 hours of exposure in the Fadeometer test or 550 ultra-violet hours of exposure in the natural weathering test are required to cause the films to deteriorate substantially.

Having described the invention, I claim:

1. A method of improving the properties of the product of the polymerization of a composition comprising a substance containing a halogen atom and a polymerizable carbon-to-carbon double bond that comprises subjecting it to intimate contact with (a) from one-hundredth to one-tenth of its weight of an inorganic peroxide and (b) from one-thousandth to one-tenth of its weight of an ester of an oxyacid of phosphorus, at a pH from about 8 to about 12.

2. A method of improving the properties of the product of the polymerization of a composition comprising a substance containing a halogen atom and a polymerizable carbon-to-carbon double bond that comprises subjecting it to intimate contact with (a) from one-hundredth to one-tenth of its weight of a complex of hydrogen peroxide with a metal salt and (b) from one-thousandth to one-tenth of its weight of an ester of an oxyacid of phosphorus, at a pH from about 8 to about 12.

3. A method of improving the properties of the product of the polymerization of a composition comprising an alpha-halo-substituted ethylene having from one to two alpha-halo substituents that comprises subjecting it to intimate contact with (a) from one-hundredth to one-tenth of its weight of an inorganic peroxide and (b) from one-thousandth to one-tenth of its weight of an ester of an oxyacid of phosphorus, at a pH from about 8 to about 12.

4. A method of improving the properties of the product of the polymerization of a composition comprising an alpha-halo-substituted ethylene having from one to two alpha-halo substituents that comprises subjecting it to intimate contact with (a) from one-hundredth to one-tenth of its weight of a complex of hydrogen peroxide with a metal salt and (b) from one-thousandth to one-tenth of its weight of an ester of an oxyacid of phosphorus, at a pH from about 8 to about 12.

5. A method of improving the properties of the product of the polymerization of a composition comprising an alpha-halo-substituted ethylene having from one to two alpha-halo substituents that comprises subjecting it to intimate contact with (a) from one-hundredth to one-tenth of its weight of a complex of hydrogen peroxide with a metal salt and (b) from one thousandth to one-tenth of its weight of tricresyl phosphate, at a pH from about 8 to about 12.

6. A method of improving the properties of the product of the polymerization of a composition comprising an alpha-halo-substituted ethylene having from one to two alpha-halo substituents that comprises subjecting it to intimate contact with (a) from one-hundredth to one-tenth of its weight of a perborate of a metal and (b) from one thousandth to one-tenth of its weight of an ester of oxyacid of phosphorus, at a pH from about 8 to about 12.

7. A method of improving the properties of the product of the polymerization of a composition comprising an alpha-halo-substituted ethylene having from one to two alpha-halo substituents that comprises subjecting it to intimate contact with (a) from one-hundredth to one-tenth of its weight of $NaBO_2.H_2O_2.3H_2O$ and (b) from one thousandth to one-tenth of its weight of tricresyl phosphate, at a pH from about 8 to about 12.

8. A composition of improved stability and durability which comprises the product of the polymerization of a composition comprising a substance containing a halogen atom and a polymerizable carbon-to-carbon double bond, and, intimately incorporated therewith, (a) an amount of an inorganic peroxide that is from one-hundredth to one-tenth of the weight of the polymerization product and (b) an amount of an ester of an oxyacid of phosphorus that is from one-thousandth to one-tenth of the weight of the polymerization product, said composition having a pH from about 8 to about 12.

9. A composition of improved stability and durability which comprises the product of the polymerization of a composition comprising a substance containing a halogen atom and a polymerizable carbon-to-carbon double bond, and, intimately incorporated therewith, (a) an amount of a complex of hydrogen peroxide with a metal salt that is from one-hundredth to one-tenth of the weight of the polymerization product and (b) an amount of an ester of an oxyacid of phosphorus that is from one-thousandth to one-tenth of the weight of the polymerization product, said composition having a pH from about 8 to about 12.

10. A composition of improved stability and durability which comprises the product of the polymerization of a composition comprising an alpha-halo-substituted ethylene having from one to two alpha-halo substituents, and, intimately incorporated therewith, (a) an amount of an inorganic peroxide that is from one-hundredth to one-tenth of the weight of the polymerization product; and (b) an amount of an ester of an oxyacid of phosphorus that is from one-thousandth to one-tenth of the weight of the polymerization product, said composition having a pH from about 8 to about 12.

11. A composition of improved stability and durability which comprises the product of the polymerization of a composition comprising an alpha-halo-substituted ethylene having from one to two alpha-halo substituents, and, intimately incorporated therewith, (a) an amount of a complex of hydrogen peroxide with a metal salt that is from one-hundredth to one-tenth of the weight of the polymerization product and (b) an amount of an ester of an oxyacid of phosphorus that is from one-thousandth to one-tenth of the weight of the polymerization product, said composition having a pH from about 8 to about 12.

12. A composition of improved stability and durability which comprises the product of the polymerization of a composition comprising an alpha-halo-substituted ethylene having from one to two alpha-halo substituents, and, intimately incorporated therewith (a) an amount of a complex of hydrogen peroxide with a metal salt that is from one-hundredth to one-tenth of the weight of the polymerization product and (b) an amount of tricresyl phosphate that is from one-thousandth to one-tenth of the weight of the polymerization product, said composition having a pH from about 8 to about 12.

13. A composition of improved stability and durability which comprises the product of the polymerization of a composition comprising an alpha-halo-substituted ethylene having from one to two alpha-halo substituents, and, intimately incorporated therewith, (a) an amount of a perborate of a metal that is from one-hundredth to one-tenth of the weight of the polymerization product and (b) an amount of an ester of an oxyacid of phosphorus that is from one-thousandth to one-tenth of the weight of the polymerization product, said composition having a pH from about 8 to about 12.

14. A composition of improved stability and durability which comprises the product of the polymerization of a composition comprising an alpha-halo-substituted ethylene having from one to two alpha-halo substituents, and, intimately incorporated therewith, (a) an amount of $NaBO_2.H_2O_2.3H_2O$ that is from one-hundredth to one-tenth of the weight of the polymerization product and (b) an amount of tricresyl phosphate that is from one thousandth to one-tenth of the weight of the polymerization product, said composition having a pH from about 8 to about 12.

15. A method of improving the properties of the product of the polymerization of a composition comprising a substance containing a polymerizable carbon-to-carbon double bond that comprises subjecting it to intimate contact with (a) from one-hundredth to one-tenth of its weight of an inorganic peroxide and (b) from one-thousandth to one-tenth of its weight of an ester of an oxyacid of phosphorus, at a pH from about 8 to about 12.

16. A method of improving the properties of the product of the polymerization of a composition comprising a substance containing a polymerizable carbon-to-carbon double bond that comprises subjecting it to intimate contact with (a) from one-hundredth to one-tenth of its weight of a complex of hydrogen peroxide with a metal salt and (b) from one-thousandth to one-tenth of its weight of an ester of an oxyacid of phosphorus, at a pH from about 8 to about 12.

17. A method of improving the properties of the product of the polymerization of a composition comprising a substance containing a polymerizable carbon-to-carbon double bond that comprises subjecting it to intimate contact with (a) from one-hundredth to one-tenth of its weight of a complex of hydrogen peroxide with a metal salt and (b) from one-thousandth to one-tenth of its weight of tricresyl phosphate, at a pH from about 8 to about 12.

18. A composition of improved stability and durability which comprises the product of the polymerization of a composition comprising a substance containing a polymerizable carbon-to-carbon double bond, and, intimately incorporated therewith, (a) an amount of an inorganic peroxide that is from one-hundredth to one-tenth of the weight of the polymerization product and (b) an amount of an ester of an oxyacid of phosphorus that is from one-thousandth to one-tenth of the weight of the polymerization product, said composition having a pH from about 8 to about 12.

19. A composition of improved stability and durability which comprises the product of the polymerization of a composition comprising a substance containing a polymerizable carbon-to-carbon double bond, and, intimately incorporated therewith, (a) an amount of a complex of hydrogen peroxide with a metal salt that is from one-hundredth to one-tenth of the weight of the polymerization product and (b) an amount of an ester of an oxyacid of phosphorus that is from one-thousandth to one-tenth of the weight of the polymerization product, said composition having a pH from about 8 to about 12.

20. A composition of improved stability and durability which comprises the product of the polymerization of a composition comprising a substance containing a polymerizable carbon-to-carbon double bond, and, intimately incorporated therewith, (a) an amount of a complex of hydrogen peroxide with a metal salt that is from one-hundredth to one-tenth of the weight of the polymerization product and (b) an amount of tricresyl phosphate that is from one-thousandth to one-tenth of the weight of the polymerization product, said composition having a pH from about 8 to about 12.

CHARLES J. CHABAN.

REFERENCES CITED

The following references are of record in the file of this patent:

UNITED STATES PATENTS

| Number | Name | Date |
|---|---|---|
| 2,068,424 | Mark | Jan. 19, 1937 |
| 2,322,756 | Wallder | June 29, 1943 |
| 2,388,319 | Fuller | Nov. 6, 1945 |
| 2,404,817 | Strain | July 30, 1946 |
| 2,419,354 | Howland | Apr. 22, 1947 |
| 2,421,408 | Brookman | June 3, 1947 |